United States Patent Office 2,787,524
Patented Apr. 2, 1957

2,787,524

CONTINUOUS CYCLIC PROCESS FOR DISSOCIATION OF AMMONIUM CHLORIDE TO RECOVER AMMONIA AND HYDROGEN CHLORIDE THEREFROM

Harry C. Claflin, Jr., Grand Island, N. Y., assignor to Olin Mathieson Chemical Corporation, a corporation of Virginia No Drawing. Application September 3, 1952,
Serial No. 307,709

6 Claims. (Cl. 23—154)

This invention relates to improvements in the recovery of ammonia and hydrogen chloride from ammonium chloride.

In one method for the dissociation of ammonium chloride to form ammonia and hydrogen chloride, a melt of an acid sulfate containing ammonium chloride may be heated under hydrogen chloride and ammonia stripping conditions, advantageously using an inert fluid medium to supply process heat and to strip the desired gases from the melt. When a mixture of ammonium chloride and sodium bisulfate for example is heated to a temperature of 200° C. and higher, hydrogen chloride is evolved and sodium ammonium sulfate is formed. At more elevated temperatures, 300° C. and higher, ammonia is evolved. The residue is largely sodium bisulfate. The reaction has not aroused commercial interest because it requires the input of considerable quantities of heat and because the salts involved are among the most corrosive materials known in commercial chemical process. For example, only tantalum, gold and platinum of the metals are resistant to the corrosive action of these molten salts and of the vaporized ammonium chloride. Glass, graphite or ceramic materials of an acid resistant nature may be employed as materials of construction for commercial equipment. The poor heat transfer qualities of these materials however seriously complicate the problem of supplying the necessary process heat since heat transfer surfaces made of corrosion resistant ceramic materials would have to be of such large areas that the equipment and heating requirements render the process wholly impractical.

It is possible however to supply all of the heat required for the process by direct contact between the materials of reaction and a stable inert fluid, preferably a vaporized organic liquid, which may be separately heated in a conventional boiler or tube type heater and thus overcome the problems of corrosion and heat transfer while simultaneously obtaining the benefit of the hot vapors as a stripping aid. The hot melt of bisulfate, to which ammonium chloride is added, then may be continuously circulated through separate stripping stages from which hydrogen chloride and ammonia are continuously removed. The circulating melt is heated in one stage to a suitable temperature, about 220° to 270° C., for stripping hydrogen chloride from the melt and to a higher temperature, about 330° to 380° C., in a second stage to permit the stripping of ammonia from the melt. Both gases are obtained in satisfactory purity although they may contain small proportions of salts which may be readily removed. The gases are obtained substantially anhydrous from the process. The cyclic nature of the process permits high yields based on the ammonium chloride charged by maintaining a concentration of about 0.15 to 0.75 mole of ammonium chloride per mole of bisulfate in the circulating melt and recycling residual undissociated ammonium chloride. Alternatively, however, the ammonium chloride may be added to a melt which is first maintained at a hydrogen chloride dissociating temperature, subsequently heated to an ammonia dissociating temperature, cooled to add fresh ammonium chloride and the cycle repeated indefinitely.

In the operation of the melt dissociation processes, however, I have found that the character of the bisulfate melt appears to change with continued use and recycling. The most significant change is a sharp increase in the melting point of the melt. This effect, if not corrected, may seriously interfere with the hydrogen chloride disengaging step, for in the proper operation of the hydrogen chloride disengaging stage, the temperature should not exceed about 270° C., and preferably is within the range of about 240° to 260° C. Since sodium bisulfate melts above 315° C., a mixed melt is ordinarily employed to obtain a melt of satisfactorily low fluid point. A mixture of sodium and ammonium bisulfates, for example, in equimolar proportions, melts as low as 170° C. and is quite fluid at hydrogen chloride disengaging temperature. I have found however that after several cycles of ammonium chloride addition and successive hydrogen chloride and ammonia stripping have been conducted, the fluid point of the melt increases to an extent seriously interfering with circulation of the melt and effective stripping operations. The situation is accentuated and loss of fluidity accelerated when an inert gas or vaporized organic such as a chlorinated aromatic compound is employed as an internal heat transfer agent and stripping aid. I have discovered however that the fluidity of the melt can be maintained and controlled by periodic or continuous addition of water to the melt system.

The water may be added from time to time as the increase in fluid point requires, or it may be added continuously in suitable proportions to maintain the fluid point within a desired range. The water may be added directly to the melt or it may be introduced with the recycling fluid stripping agent or as wet ammonium chloride. The water may be added in various forms; i. e., as steam, sulfuric acid or sodium bisulfate monohydrate at any appropriate point in the system. Although liquid water may be added to the system, it is usually more convenient to add the water in the form of steam because of the temperatures involved. The steam is preferably added to the melt entering the ammonia stripping tower in a continuous system or added during the ammonia stripping operation in batch operation. Alternatively, steam may be added to the stripping medium entering the ammonia stripping tower of the continuous system or entering the melt during the ammonia stripping step of the batch system. Under these conditions the very hygroscopic nature of the melt absorbs the steam quickly and no significant amount escapes with the ammonia. Steam is preferably added in the ammonia disengaging step to insure that no moisture combines with the anhydrous hydrogen chloride. The latter is very corrosive, particularly at lower temperatures, when moisture is also present but is relatively non-corrosive when free from moisture. When a circulating heat transfer fluid such as a chlorinated aromatic compound is employed, all traces of water should be removed before returning it to the boiler and superheater in order to avoid corrosion. This may be accomplished by passing the liquid through a drying tower filled with a suitable drying agent, for example, calcium chloride or activated alumina.

Sufficient water should be added to the system to keep the fluid point of the melt below the temperature at which hydrogen chloride is disengaged and also below the temperature at which objectionable amounts of ammonium chloride are sublimed. Preferably the fluid point of the melt is kept below about 260° C. The amount of water required is related to the volume of stripping agent employed, the temperatures involved and the amount of ammonium chloride introduced. Some water may be carried into the system with the ammonium chloride.

The total requirement of added water generally amounts to about 0.25% of the weight of the stripping fluid circulated per cycle. This may vary however in particular cases from about 0.05% to about 1%.

Suitable melts may be prepared, for example, from sodium bisulfate monohydrate and ammonium sulfate, stripping the moisture and excess ammonia out at elevated temperatures of for example, 360° C., using a stable organic vapor as stripping agent. When the ammonia evolution at this temperature slackens, melts may be formed corresponding to the following composition:

| Component | Melt No. 1, Moles | Melt No. 2, Moles |
|---|---|---|
| $Na^+$ | 0.58 | 0.4 |
| $NH_4^+$ | 0.62 | 0.8 |
| $H^+$ | 0.8 | 0.8 |
| $SO_4^=$ | 1.0 | 1.0 |

Such compositions have fluid points of about 240° to 245° C. The fluid points referred to are not sharp melting points since the melt compositions soften and liquefy over an appreciable temperature range. Furthermore, the melts are never entirely transparent but contain some suspended material which, however, in minor proportions is not deleterious. Just below the fluid point the melt begins to form a slurry and at a temperature 5° C. below the fluid point reported, the melt is semi-solid, difficultly stirrable and not pumpable.

When ammonium chloride is added to such a melt at about 260° C., together with suitable proportions of stripping agent, hydrogen chloride is vigorously evolved. After the evolution of hydrogen chloride decreases, the temperature is raised to 360° C. when ammonia is evolved. When the melt is used and re-used, cooling to about 260° C., adding more ammonium chloride and repeating the cycle, the fluid point rises and insoluble material precipitates. In order to maintain a stirrable or pumpable mixture it is necessary to avoid cooling the melt after the ammonia stripping step to a temperature suitable for the hydrogen chloride stripping step. It may be necessary, in order to circuate or stir the melt, to maintain temperatures even above 290° C. At such temperatures, the proportion of ammonium chloride vaporized from the melt increases and the proportion of hydrogen chloride evolved decreases. Separation of the hydrogen chloride from the mixture is more difficult, yields per pass are lower and much ammonium chloride must be recycled.

The character of the change occurring in the melt is not entirely clear. Substantially no sulfur dioxide appears in any of the exit gases. Under the substantially anhydrous conditions of operation, some pyrosulfates may be formed by dehydration of the sulfates. Also, in the presence of ammonia and ammonium chloride, sulfamic acid or sulfamide may be formed in limited quantities in the melt. Whatever the cause, the separation of solid materials tends to convert the melt at any given temperature to a mush of crystals which may be stirred or pumped only with difficulty. Eventually, unless this condition is corrected, the temperature of the melt must be maintained at such an elevated temperature that the hydrogen chloride obtained is so contaminated by ammonium chloride that in effect little separation is accomplished.

The following examples illustrate application of my invention to correct these difficulties, without intending however to be limiting with respect to the operations described.

*Example I*

A melt of 30 moles of sodium and ammonium bisulfate was prepared from sodium bisulfate monohydrate and ammonium sulfate by stripping out ammonia and water with trichlorobenzene vapors at temperatures of 300° to 360° C. The melt then had a fluid point of 245° C. and the following molar composition:

$Na^+$ ---- 0.58
$NH_4^+$ ---- .62
$H^+$ ---- .80
$SO_4^=$ ---- 1.0

A 25% slurry of ammonium chloride containing 6 moles of salt in boiling trichlorobenzene (about 215° C.) was added to the above melt which had an initial temperature of 280° C. Additional superheated trichlorobenzene vapor amounting to 11.15 liters of liquid condensate was passed through the melt at about 260° C. to strip hydrogen chloride therefrom. The melt temperature was subsequently raised to 360° C. and the ammonia was stripped with trichlorobenzene vapors. When a total of three such cycles had been completed and 79 liters of trichlorobenzene condensate had been obtained, the fluid point of the melt had risen to 290–295° C. and operation became noticeably difficult. After two further cycles of operation, the addition of 100 ml. of 98% sulfuric acid reduced the fluid point of the melt to about 260° C. Two and one-half additional cycles were completed without the necessity of further treatment of the melt.

*Example II*

A melt prepared as described in Example I had a melting point of 240–245° C. and a molar composition as follows:

$Na^+$ ---- 0.40
$NH_4^+$ ---- .76
$H^+$ ---- .84
$SO_4^=$ ---- 1.0

Ammonium chloride was added at a maximum melt temperature of 275° C., hydrogen chloride was stripped out with trichlorobenzene vapors and then ammonia at 355° C. This cycle was repeated for 9.5 times. At the end of the hydrogen chloride stripping stages, the melt averaged about 0.95 mole of $NH_4^+$ and about 0.65 mol of $H^+$ per mole of $SO_4^=$. At the end of the ammonia stripping stages the average $NH_4^=$ content was reduced to about 0.75 mole and the $H^+$ content rose to about 0.85 mole per mole of $SO_4^=$. The following table shows the fluid point of the melt at various times and the beneficial effect of added water in reducing the melting point:

| Cycle No. | Stripping Stage | Fluid Point, °C. | Water Added, ml. |
|---|---|---|---|
| 1 | HCl | 250 | |
|   | NH₃ |     | |
| 2 | HCl |     | |
|   | NH₃ | 295 | |
| 3 | HCl | 280 | 200 |
|   | NH₃ | 240 | |
| 4 | HCl | 270 | |
|   | NH₃ |     | 200 |
| 5 | HCl | 250 | |
|   | NH₃ |     | |
| 6 | HCl | 270 | |
|   | NH₃ |     | 100 |
| 7 | HCl | 270 | 100 |
|   | NH₃ | 250 | |
| 8 | HCl | 260 | |
|   | NH₃ |     | 100 |
| 9 | HCl | 263 | |
|   | NH₃ |     | 100 |
| 10 | HCl | 270 | |
|    | NH₃ |     | 100 |
| 11 | HCl | 265 | |

The organic medium employed advantageously is a liquid of sufficiently high boiling point to facilitate its separation from the product vapors in the hydrogen chloride and ammonia recovery operations. The organic liquid must be stable in the vapor phase at temperatures permitting the introduction of sufficient heat into the system to effect the desired separating and stripping reaction without requiring unreasonable ratios of organic liquid to ammonium chloride. An organic liquid which is substantially stable at 500° C. or higher is satisfactory. The vapor also must be stable under the conditions of stripping and must be chemically inert with respect to the reaction materials. Chlorinated aromatics are highly effective, for example, chlorobenzene and orthodichlorobenzene, particularly a stabilized orthodichlorobenzene, such as Dowtherm E. Higher boiling chlorinated aromatics, such as mixed isomeric trichlorobenzenes or the Arochlors (chlorinated diphenyls) also are suitable since in general they are stable at temperatures of about 500° C. Although the requirements for the organic medium are rather exacting they are not necessarily related to chemical composition or structure and therefore a broad range of vaporizable heat stable organic liquids having the requisite chemical inertness within the reaction system are available. For example, benzene itself is useful since it has a high degree of thermal stability. However, it has the disadvantages of a low boiling point which makes its separation from the product gases more difficult than in the case of the higher boiling liquids and its flammability introduces a serious fire hazard.

Sodium bisulfate is preferred as the reacting acid sulfate because of its cheapness and availability. The other alkali metal bisulfates and ammonium bisulfate also are useful. A mixture of about 50 to 75 percent of sodium bisulfate with ammonium bisulfate is particularly advantageous and is preferred since it has the lowest melting point and, when melted, the lowest viscosity of any of the acid sulfates or acid sulfate mixtures. Other mixed melts may be employed; e. g. potassium bisulfate or lithium bisulfate containing melts, or three component melt mixtures.

I claim:

1. In a continuous cyclic process for the dissociation of ammonium chloride to recover ammonia and hydrogen chloride by successively adding ammonium chloride to a melt of an acid sulfate, passing a stable inert organic stripping fluid through the melt to disengage hydrogen chloride therefrom and passing a stable inert organic stripping fluid through the melt at a higher temperature to remove ammonia therefrom, the improvement which comprises maintaining the fluid point of the melt below the temperature at which hydrogen chloride is disengaged by introducing water into the melt in an amount of from about 0.05 percent to about 1 percent of the weight of stripping fluids passed through the melt per cycle.

2. In a continuous cyclic process for the dissociation of ammonium chloride to recover ammonia and hydrogen chloride by successively adding ammonium chloride to a melt of an acid sulfate circulating in a closed cycle to maintain a concentration of 0.15 to 0.75 mole of ammonium chloride per mole of acid sulfate in the melt, passing a stable inert organic stripping fluid through the melt at a temperature of 220° to 270° C. to disengage hydrogen chloride therefrom and passing a stable inert organic stripping fluid through the melt at a temperature of 330° to 380° C. to remove ammonia therefrom, the improvement which comprises maintaining the fluid point of the melt below the temperature at which hydrogen chloride is disengaged by introducing water into the melt in an amount of from about 0.05 percent to about 1 percent of the weight of stripping fluids passed through the melt per cycle.

3. A process according to claim 2 in which water is introduced into the melt by adding liquid water to the melt.

4. A process according to claim 2 in which water is introduced into the melt by adding a hydrate of the acid sulfate to the melt.

5. A process according to claim 2 in which water is introduced into the melt by adding steam to the melt.

6. A process according to claim 2 in which the water is introduced into the melt by adding concentrated sulfuric acid to the melt.

References Cited in the file of this patent
UNITED STATES PATENTS

| | | |
|---|---|---|
| 1,718,420 | Kessler | June 25, 1929 |
| 1,892,652 | Heath | Dec. 27, 1932 |